(12) United States Patent
Mita et al.

(10) Patent No.: US 6,220,380 B1
(45) Date of Patent: Apr. 24, 2001

(54) ELECTRIC VEHICLE WITH BATTERY BOX ARRANGEMENT

(75) Inventors: Yoshinori Mita; Makoto Anazawa; Akishiro Takeuchi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/216,028

(22) Filed: Dec. 18, 1998

(30) Foreign Application Priority Data

Dec. 18, 1997 (JP) .................................................. 9-348795

(51) Int. Cl.$^7$ .................................................. B60K 1/00
(52) U.S. Cl. ............................................................ 180/65.1
(58) Field of Search ............................. 180/65.1, 68.5, 180/65.6, 60, 297

(56) References Cited

U.S. PATENT DOCUMENTS

| | | | |
|---|---|---|---|
| 5,487,438 | * | 1/1996 | Kinoshita ............................. 180/65.1 |
| 5,513,719 | * | 5/1996 | Moroto et al. ....................... 180/65.4 |
| 5,641,031 | * | 6/1997 | Riemer et al. ....................... 180/65.3 |
| 5,713,425 | * | 2/1998 | Buschhaus et al. ................. 180/65.2 |
| 5,734,238 | * | 3/1998 | Yanagisawa et al. ................ 318/139 |
| 5,771,478 | * | 6/1998 | Tsukamoto et al. .................... 701/68 |
| 5,994,789 | * | 11/1999 | Ochiai ................................. 307/10.1 |
| 6,087,874 | * | 7/2000 | Nishikawa .......................... 180/68.5 |
| 6,105,696 | * | 8/2000 | Chen ................................... 180/65.1 |
| 6,109,380 | * | 8/2000 | Veenstra ............................. 180/68.5 |

* cited by examiner

*Primary Examiner*—Brian L. Johnson
*Assistant Examiner*—G. Klebe
(74) *Attorney, Agent, or Firm*—Carrier, Blackman & Associates, P.C.; Joseph P. Carrier; William D. Blackman

(57) ABSTRACT

A battery box is detachably supported below a floor panel at a central portion of an electric vehicle. Batteries are mounted in a rear portion of the battery box, and a control unit and a PDU are mounted in a front portion of the battery box. As a result, the positions of the control unit and the PDU are lowered, which can contribute to the lowering of the center of gravity of a vehicle, and power lines extending from the batteries via the control unit and the PDU to a road wheel driving motor can be disposed at shortest distances, whereby the lengths of the power lines can be suppressed to the minimum.

18 Claims, 8 Drawing Sheets

ELECTRIC VEHICLE WITH BATTERY BOX ARRANGEMENT

BACKGROUND OF THE INVENTION

1. Field of the Invention

The present invention relates to an electric vehicle, including a battery box which has batteries accommodated therein and which is mounted below a floor panel at a central portion of a vehicle body, wherein the supply of electric current from the batteries to a motor mounted at a front portion of the vehicle body is controlled by a control unit.

2. Description of the Related Art

FIG. 8 shows a conventional electric vehicle. A power unit 01 mounted at a front portion of a vehicle body is integrally provided with a motor 02, a reduction device 03 and a differential 04, and front wheels 08, 08 are driven for traveling of the vehicle by supplying power of batteries 05 mounted at a central portion of the vehicle body through a control unit 06 and an inverter 07 to the motor 02.

The above conventional electric vehicle suffers from problems in that lowering of the center of gravity of the vehicle is obstructed by the relatively high weight of the control unit 06 and the inverter 07, because the control unit 06 and the inverter 07 are disposed above the motor 02, and in that power lines 09 and 010 connecting the batteries 05 and the motor 02 to each other are disposed to extend via the control unit 06 and the inverter 07, above the motor 02. For this second reason, the lengths of the power lines 09 and 010 are extended, thereby making it difficult to provide an efficient layout of same.

SUMMARY OF THE INVENTION

Accordingly, it is an object of the present invention to lower the center of gravity of the electric vehicle and to reduce the lengths of the power lines connecting the batteries and the motor to each other.

To achieve the above object, according to a first aspect and feature of the present invention, there is provided an electric vehicle comprising a battery box which has batteries accommodated therein and which is mounted below a floor panel at a central portion of a vehicle body, wherein the supply of electric current from the batteries to a motor mounted at a front portion of the vehicle body is controlled by a control unit, and wherein the control unit is disposed in a space provided within the battery box in front of the batteries.

With the above arrangement, the control unit is supported in the front portion of the battery box mounted below the floor panel at the central portion of the vehicle body and hence, the position of the control unit is lowered to contribute to the lowering of the center of gravity of the vehicle, and moreover the power lines extending from the batteries via the control unit to the motor can be disposed at very short distances given the disposition of the control unit longitudinally between the batteries and the motor, whereby the lengths of the power lines can be suppressed to the minimum. Moreover, the battery box is efficiently used for supporting both the batteries and the control unit, thereby reducing the number of parts and reducing the cost and weight.

According to a second aspect and feature of the present invention, in addition to the arrangement of the first feature, an inverter is mounted to a rear end of the motor for converting DC current provided by the batteries into AC current to drive the motor.

With the above arrangement, since the inverter is mounted to the motor, the length of an AC power line connecting the inverter and the motor to each other is shortened. Thus, it is possible to reduce the weight of the power line, and to suppress the generation of heat due to an electric resistance of the power line and to reduce the amount of noise generated by the power line. Moreover, since the inverter is mounted to the rear end of the motor, the length of a DC power line connecting the batteries mounted at the central portion of the vehicle body and the inverter to each other can be suppressed to the minimum.

The above and other objects, features and advantages of the invention will become apparent from the following description of preferred embodiment taken in conjunction with the accompanying drawings.

BRIEF DESCRIPTION OF THE DRAWINGS

FIGS. 1 to 5 show a first embodiment of the present invention, wherein

FIG. 1 is a side view of the entire electric vehicle;

FIG. 2 is a perspective view of the entire electric vehicle;

FIG. 3 is a perspective view of the entire electric vehicle similar to FIG. 1, but with a battery box removed;

FIG. 4 is a block diagram of a driving system and a control system in the electric vehicle;

FIG. 5 is a partial sectional view taken in a direction of an arrow 5 in FIG. 1;

FIGS. 6 and 7 show important portions of a second embodiment of the present invention, wherein FIG. 6 is a partly sectional plan view of a motor and a PDU (shown in solid lines) and a different casing (shown in broken lines);

FIG. 7 is a view taken in a direction of an arrow 7 in FIG. 6; and

DETAILED DESCRIPTION OF THE PREFERRED EMBODIMENTS

A first embodiment of the present invention will now be described below with reference to FIGS. 1 to 5.

Figure 1:
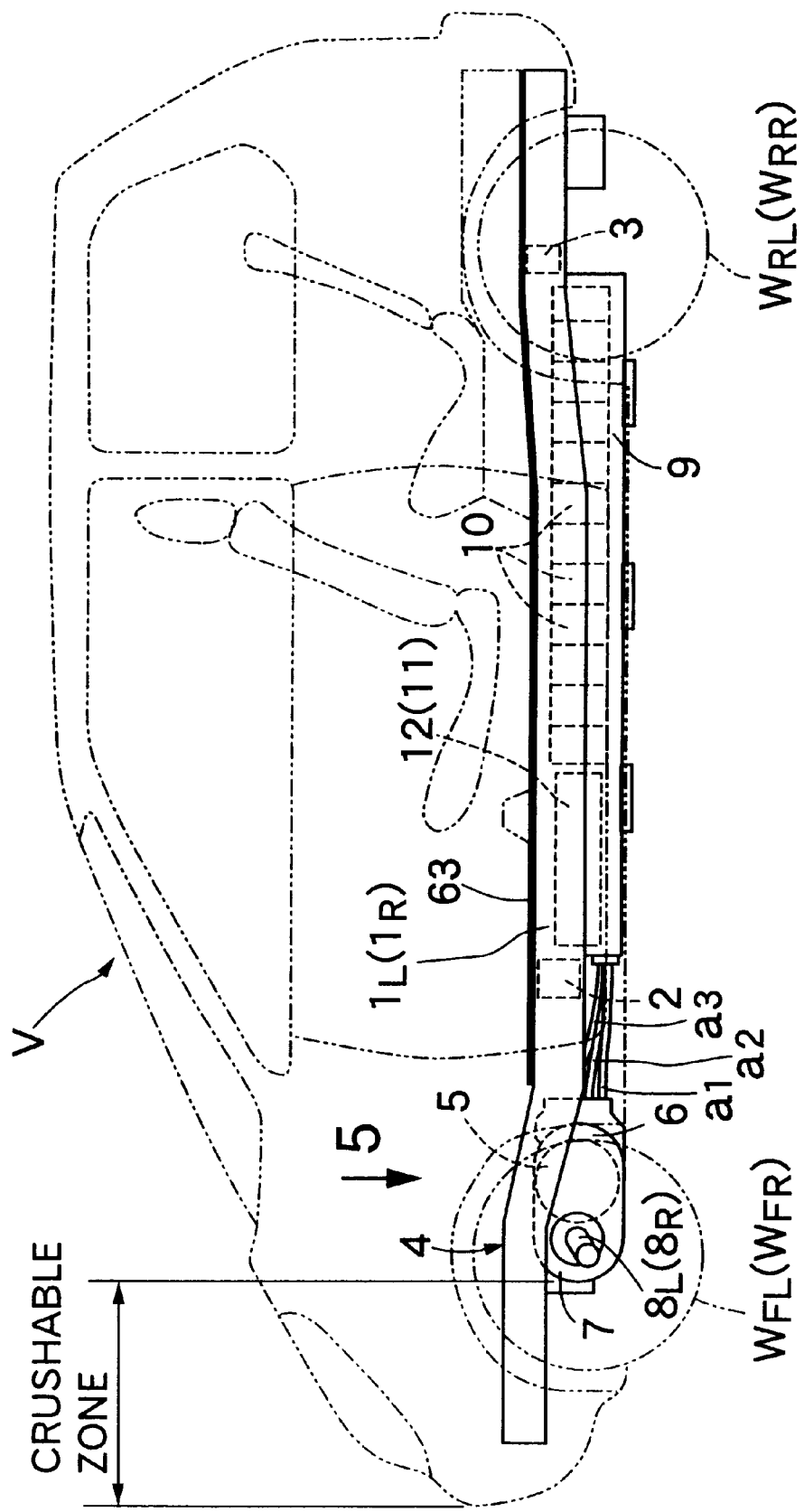
Figure 2:
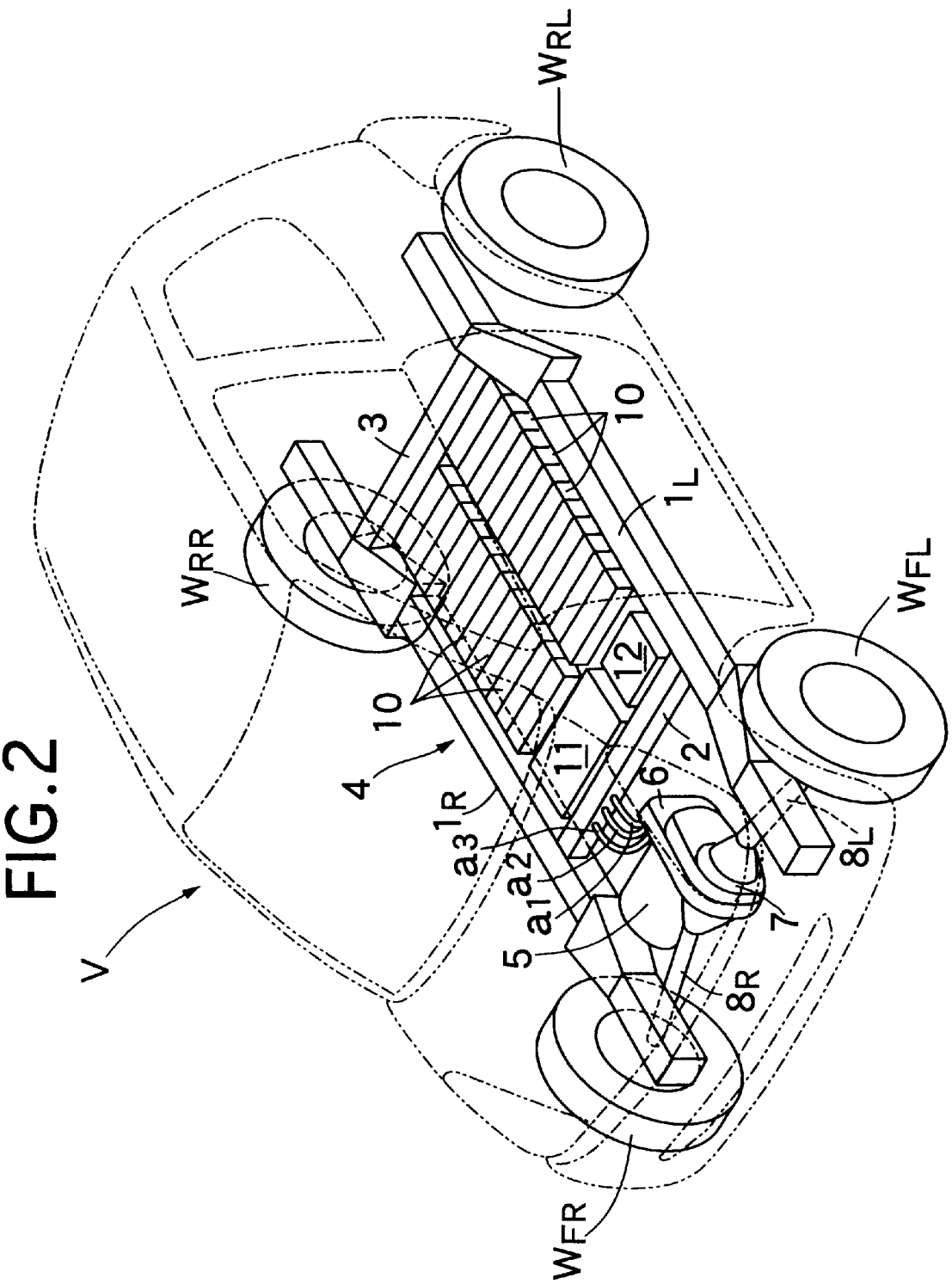
Figure 3:
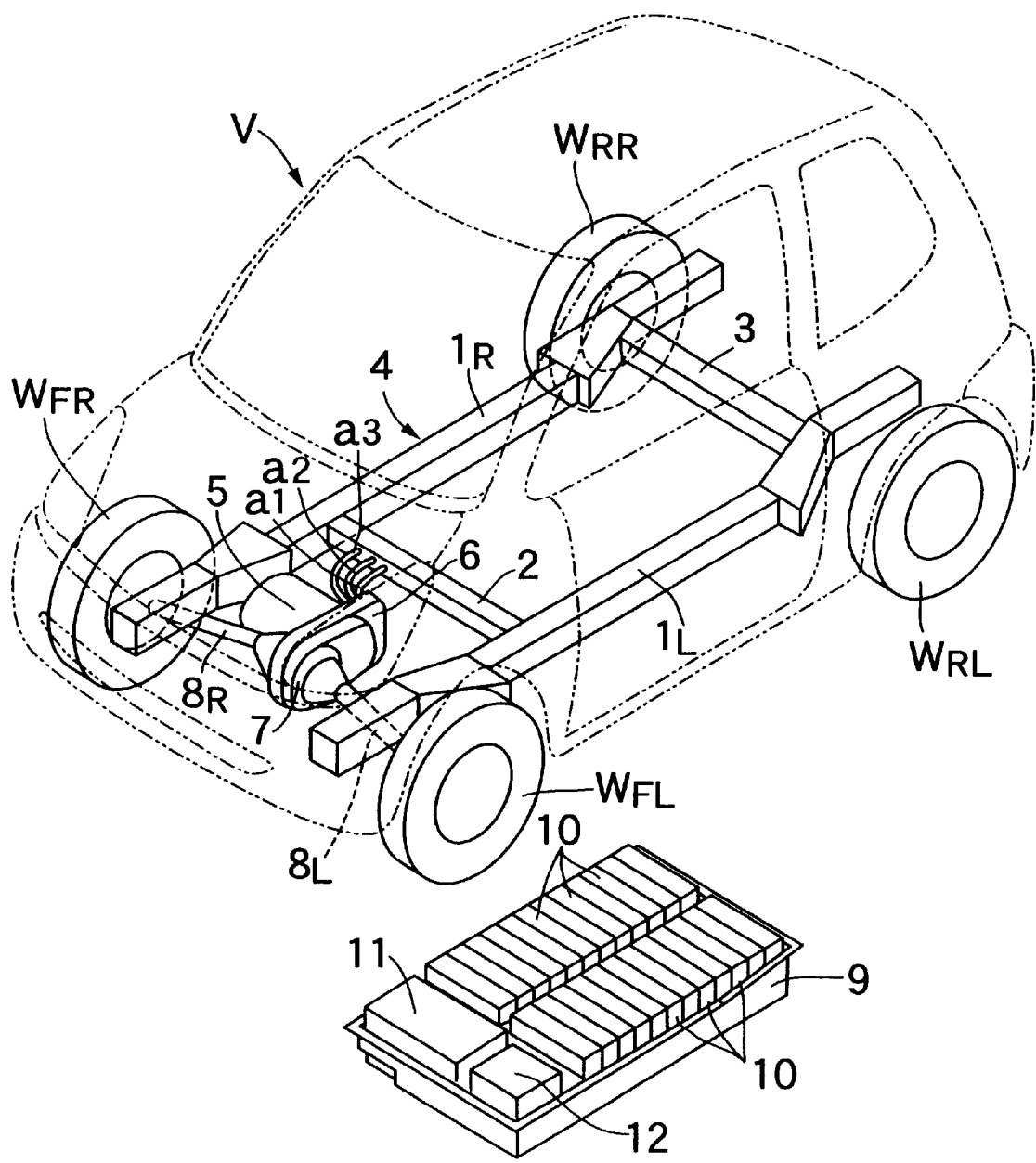

As shown in FIGS. 1 to 3, an electric vehicle V provided with left and right front wheels $W_{FL}$ and $W_{FR}$ and left and right rear wheels $W_{RL}$ and $W_{RR}$ includes a vehicle body frame assembly 4 which is comprised of a pair of left and right side frames $1_L$ and $1_R$ extending in a longitudinal direction of a vehicle body, and a front cross member 2 and a rear cross member 3 which extend in a lateral direction of the vehicle body and connect the side frames $1_L$ and $1_R$ to each other. A reduction device 6 and a differential 7 are integrally provided on a motor 5 which is a traveling drive source mounted between front ends of the left and right side frames $1_L$ and $1_R$. Drive shafts $8^L$ and $8^R$ extending laterally from the differential 7 are connected to the left and right front wheels $W_{FL}$ and $W_{FR}$, respectively.

A shallow tray-shaped battery box 9 with its upper surface opened is detachably supported on a lower surface of the vehicle body frame assembly 4. Twenty four batteries 10 for supplying electric current to the motor 5 are mounted in two rows in a rear half of the battery box 9, and the following components (1) and (2) are mounted in a front half of the battery box 9: (1) a control unit 11 for controlling the motor 5, the batteries 10 and various auxiliaries, and (2) a PDU 12 (power drive unit) comprising an inverter for controlling the driving and regenerative operation of the motor 5 by a command from the control unit 11. The PDU 12 is adapted to convert a DC current of the batteries 10 into a three-phase AC current to drive the motor 5, and to convert the three-phase AC current generated by the motor 5 into the DC current to charge the batteries 10 in carrying out the regenerative operation of the motor 5.

Figure 4:
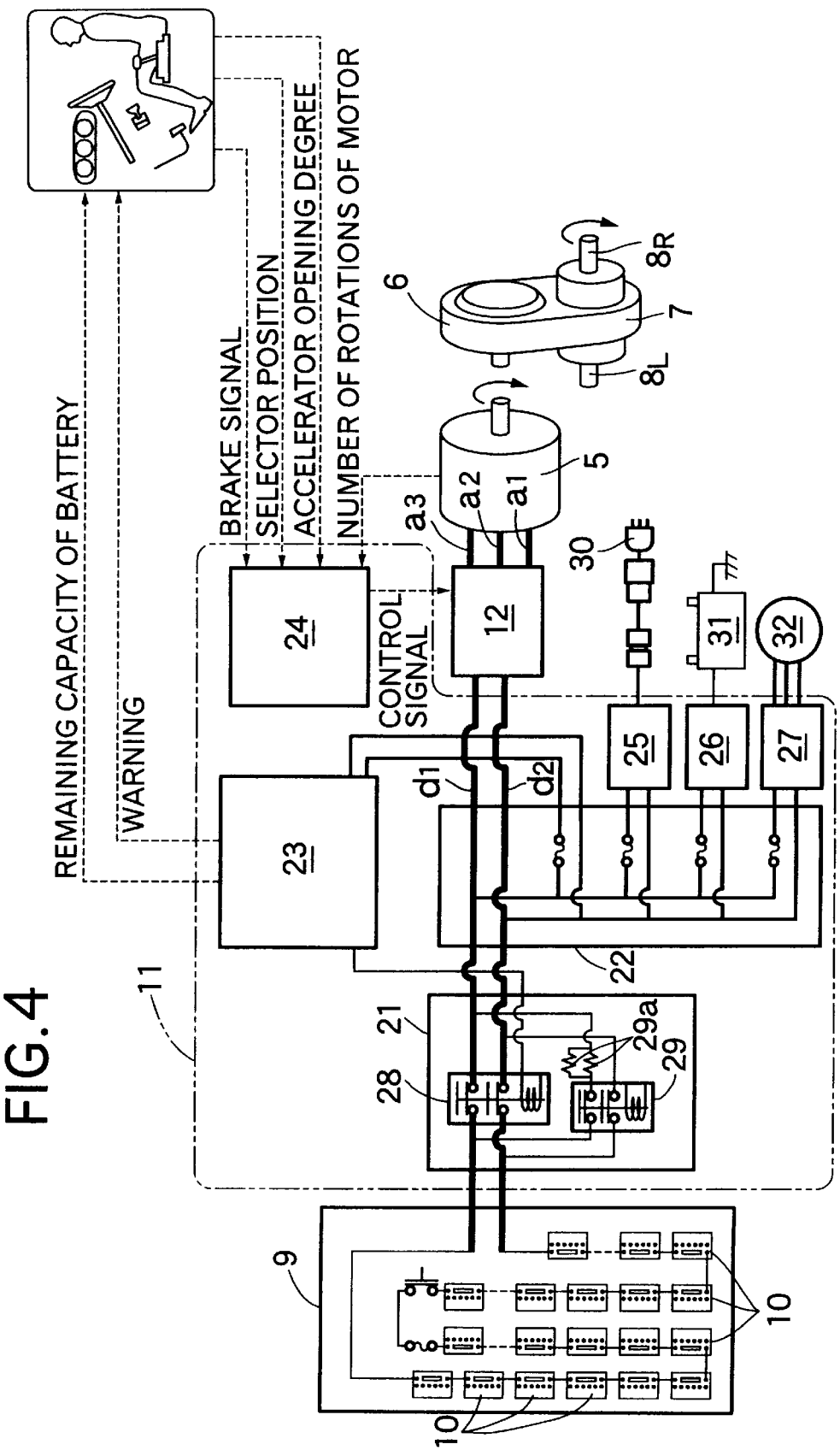

An outline of the arrangement of a drive system and a control system for the electric vehicle V will now be described with reference to FIG. 4. In FIG. 4, thick solid lines indicate high-voltage and high-current lines; medium solid lines indicate high-voltage and medium-current lines; thin solid lines indicate a low-voltage and low-current lines; and arrowed dashed lines indicate signal lines.

The control unit 11 is comprised of a contact box 21, a junction board 22, a managing ECU 23 (a managing electronic control unit), a motor ECU 24 (a motor electronic control unit), an on-board charger 25, a down-converter 26, and an air-conditioning inverter 27.

The batteries 10 are mounted in the battery box 9, each of which is comprised of an Ni-MH battery, and the twenty four batteries 10 are connected in series to provide a total voltage of 288 V. The contact box 21, the junction board 22 and the PDU 12 are connected in series between the battery box 9 and the motor 5 through DC power lines $d_1$ and $d_2$, and the PDU 12 and the motor 5 are connected to each other through three-phase AC power lines $a_1$, $a_2$ and $a_3$.

Provided in the contact box 21 connected to the batteries 10 are a main contact 28 which is opened and closed in operative association with an ignition switch, and a pre-charger contact 29 and a pre-charger resistor 29a for preventing the main contact from being damaged due to rush current upon closing of the main contact 28. The junction board 22 has a function to distribute electric current from the DC power lines $d_1$ and $d_2$ between the contact box 21 and the PDU 12 to the on-board charger 25, the down-converter 26 and the air-conditioning inverter 27. The on-board charger 25 serves to charge the batteries 10, and includes a plug 30 connectable to an external commercial power source. The down-converter 26 serves to charge an auxiliary battery 31 of 12 volts for driving the various auxiliaries of the electric vehicle V, and is adapted to drop the voltage of the batteries 10 to 14.5 V to supply it to the auxiliary battery 31. The air-conditioning inverter 27 is adapted to convert the DC current of the batteries 10 into the AC current to drive a compressor 32 of an air conditioner.

The managing ECU 23 governs the control of opening and closing of the main contact 28, the supplying of power to the on-board charger 25, the down-converter 26 and the air-conditioning inverter 27, the outputting of a signal indicative of a remaining capacity of the batteries 10, and the outputting of a warning signal. The motor ECU 24 controls the driving force and the regenerative braking force generated by the motor 5 by controlling the PDU 12 based on a brake signal, a selector position, an accelerator opening degree and a number of rotations per minute of the motor.

Figure 5:
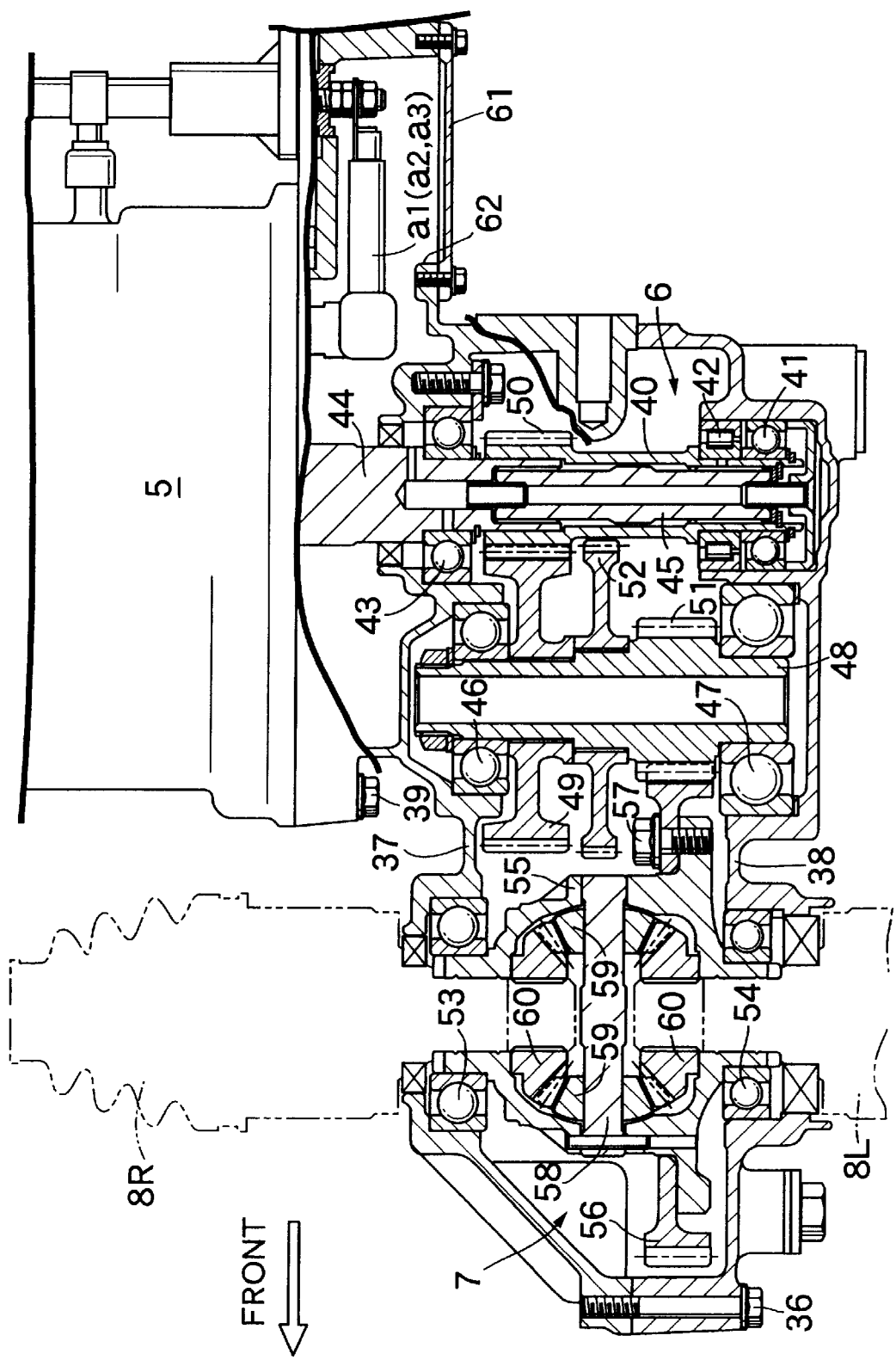

The structures of the reduction device 6 and the differential 7 will be described below with reference to FIG. 5.

The reduction device 6 and the differential 7 are accommodated within a right casing 37 and a left casing 38 which are divided laterally from each other and coupled to each other by bolts 36, and a left end face of the motor 5 is coupled to a right side of a rear portion of the right casing 37 by bolts 39. A left end of a hollow main shaft 40 is supported on the left casing 38 through a ball bearing 41 and a roller bearing 42. A motor output shaft 44 protruding from a left end face of the motor 5 is supported on the right casing 37 through a ball bearing 43 and relatively rotatably fitted to an inner periphery of an right end of the main shaft 40. A torsion shaft 45 is spline-engaged at its right end with an inner periphery of a left end of the motor output shaft 44 and spline-engaged at its left end with an inner periphery of a left end of the main shaft 40. Thus, the rotation of the motor output shaft 44 is transmitted through the torsion shaft 45 to the main shaft 40, and during this time, the variation in torque of the motor 5 is buffered by the torsional deformation of the torsion shaft 45.

A counter shaft 48 is supported on the right casing 37 and the left casing 39 through ball bearings 46 and 47, respectively, and a driven gear 49 provided on the counter shaft 48 is meshed with a driving gear 50 provided on the main shaft 40. Further, the counter shaft 48 is provided with a final driving gear 51 for transmitting the driving force to the differential 7, and a parking gear 52 capable of being locked by a parking pawl which is not shown.

A differential gear box 55 is supported on the right casing 37 and the left casing 38 through ball bearings 53 and 54, respectively, and a final driven gear 56 meshed with the final driving gear 51 is fixed to an outer periphery of the differential gear box 55 by bolts 57. A pair of differential pinions 59, 59 are rotatably carried on a pinion shaft 58 supported in the differential gear box 55, and are meshed with a pair of differential side gears 60, 60, respectively, which are fixed to inner ends of the left and right driving shaft $8_L$ and $8_R$ fitted in the differential gear box 55.

An inspecting window 62 is defined in a left side of a rear portion of the right casing 37 and covered with a detachable cover 61, so that the inspection of the three-phase AC power lines $a_1$, $a_2$ and $a_3$ accommodated within the right casing 37 can be easily carried out by removing the cover 61.

Thus, the driving force of the motor 5 is transmitted from the motor output shaft 44 to the left and right front wheels $W_{FL}$ and $W_{FR}$ through the torsion shaft 45, the main shaft 40, the driving gear 50, the driven gear 49, the counter shaft 48, the final driving gear 51, the final driven gear 56, the differential gear box 55, the pinion shaft 58, the differential pinions 59, 59, the differential side gears 60, 60, and the left and right driving shafts $8_L$ and $8_R$. The switching-over between the forward movement and the rearward movement of the electric vehicle is carried out by changing the direction of rotation of the motor 5.

As can be seen from FIGS. 1 and 5, the motor 5 and the reducer 6 are disposed at a portion of the vehicle body rearwardly of the differential 7, and the motor 5, the reducer 6 and the differential 7 are disposed at lower locations below, or lower than the level of a floor panel 63 (shown by a thick line in FIG. 1) supported on an upper surface of the vehicle body frame assembly 4. The panel 63 extends from the vicinity of the motor 5 and the reduction device 6 toward the rear portion of the vehicle body. As a result, a longitudinal dimension of a crushable zone (see FIG. 1) defined between a front end of the vehicle body and a front end of the differential 7 can be enlarged to the maximum, thereby enhancing the shock absorbing effect of such zone upon a collision of the vehicle. Moreover, since the 6 motor 5 and the reduction device 6 which are heavy components are disposed at locations in rear of the positions of rotational axes of the front wheels $W_{FL}$ and $W_{FR}$, a so-called mid-ship layout can be achieved to contribute to an enhancement in motional performance of the vehicle.

Further, since the motor 5, the reduction device 6 and the differential 7 are disposed below the level of the floor panel 63, the position of the center of gravity of the vehicle can be lowered to enhance the vehicle's stability. Moreover, even if the motor 5, the reduction device 6 and the differential 7 are moved rearwards of the vehicle body due to a shock of collision of the vehicle, the influence thereof applied to the vehicle compartment above the floor panel 63 can be suppressed to the minimum.

As described above, the control unit 11 and the PDU 12 are mounted by utilizing the front space in the battery box 9 closer to the motor 5 and hence, the DC power lines $d_1$ and $d_2$ from the batteries 10 via the control unit 11 to the PDU 12 and the three-phase AC power lines $a_1$, $a_2$ and $a_3$ from the PDU 12 to the motor 5 can be disposed at shortest distances, whereby the their lengths can be suppressed to the minimum. Also, the maintenance of the batteries 10 and the maintenance of the control unit 11 and the PDU 12 can be carried out simultaneously, leading to an enhanced convenience. Moreover, the control unit 11 and the PDU 12 are disposed at the locations below the floor panel 63, which can contribute to the lowering of the center of gravity of the vehicle.

Figure 6:
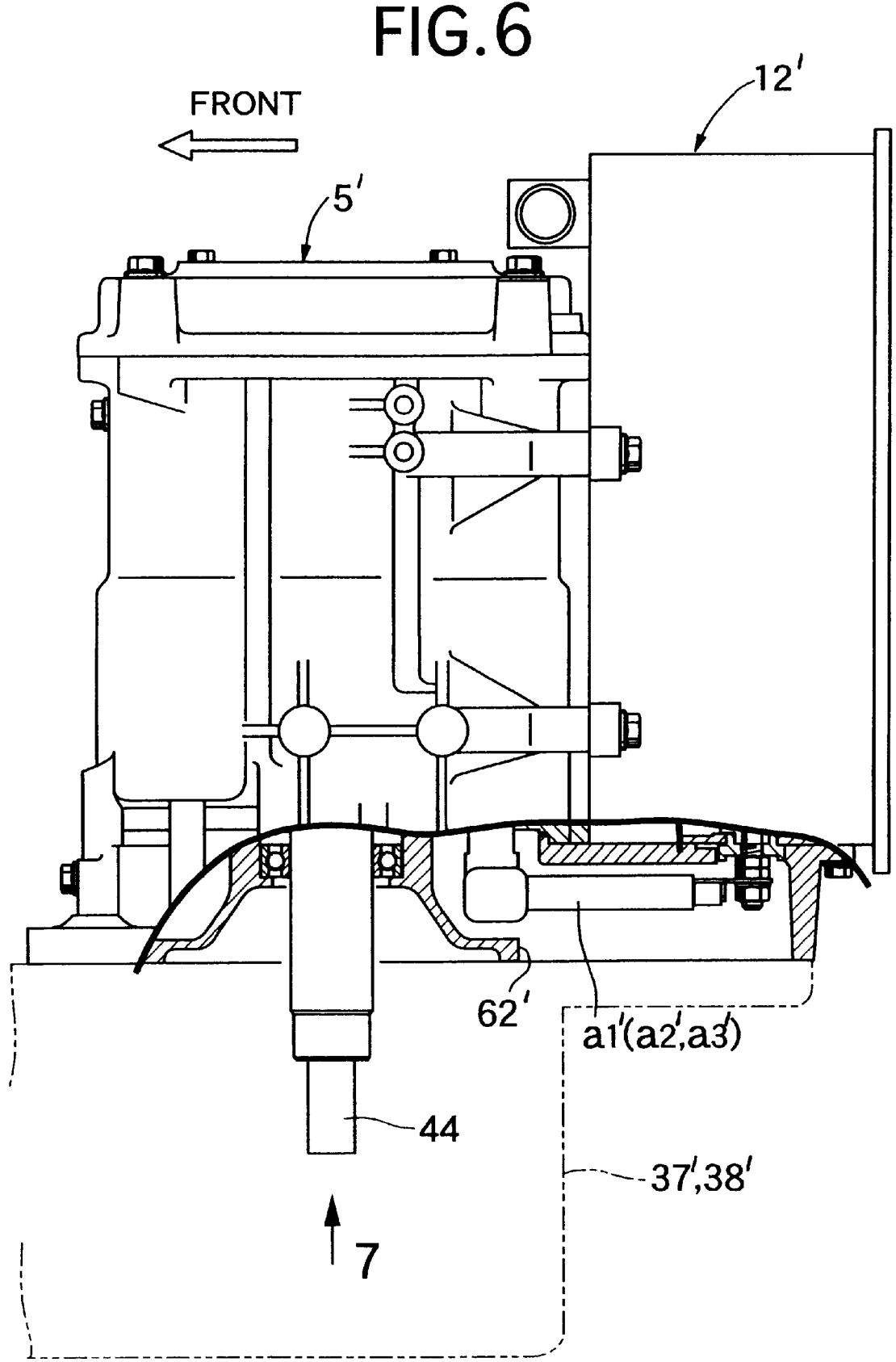
Figure 7:
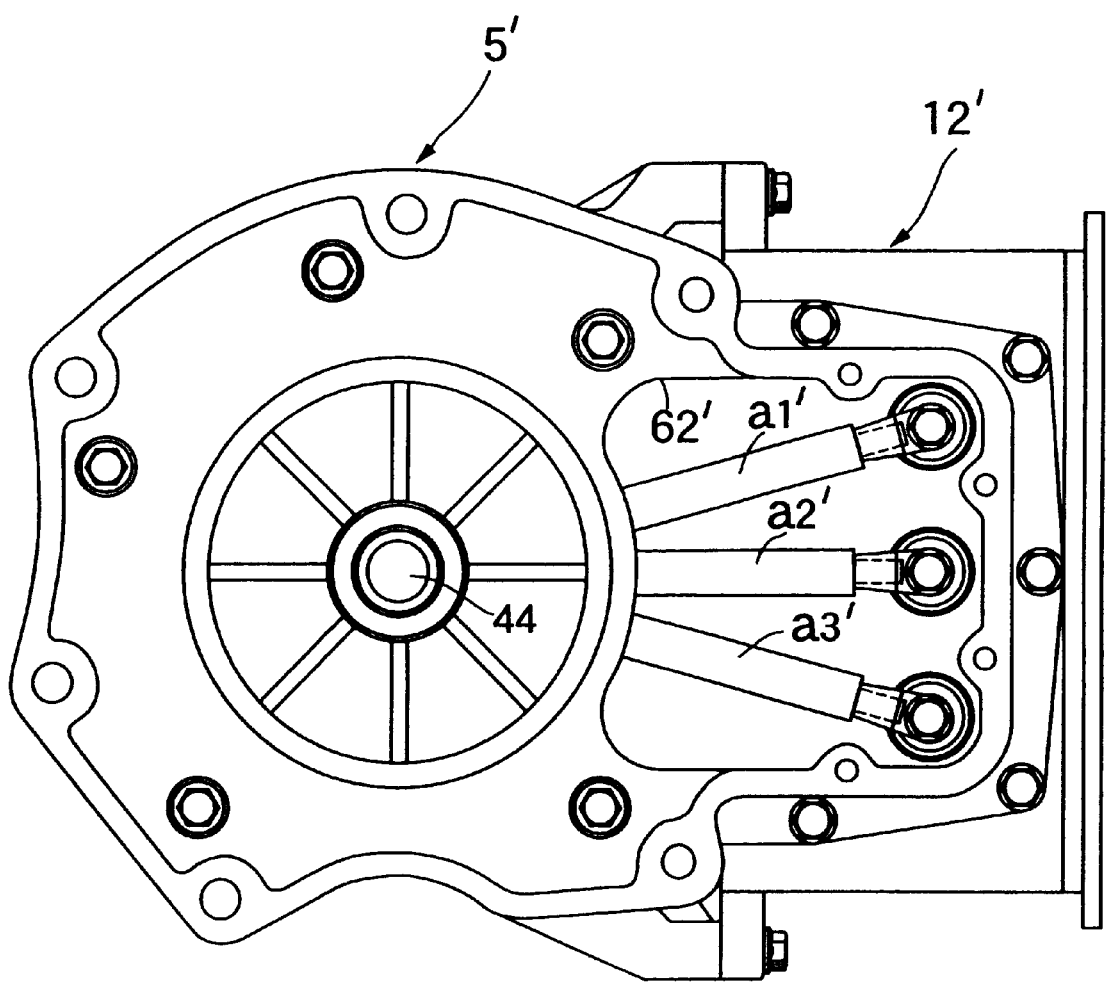
Figure 8:
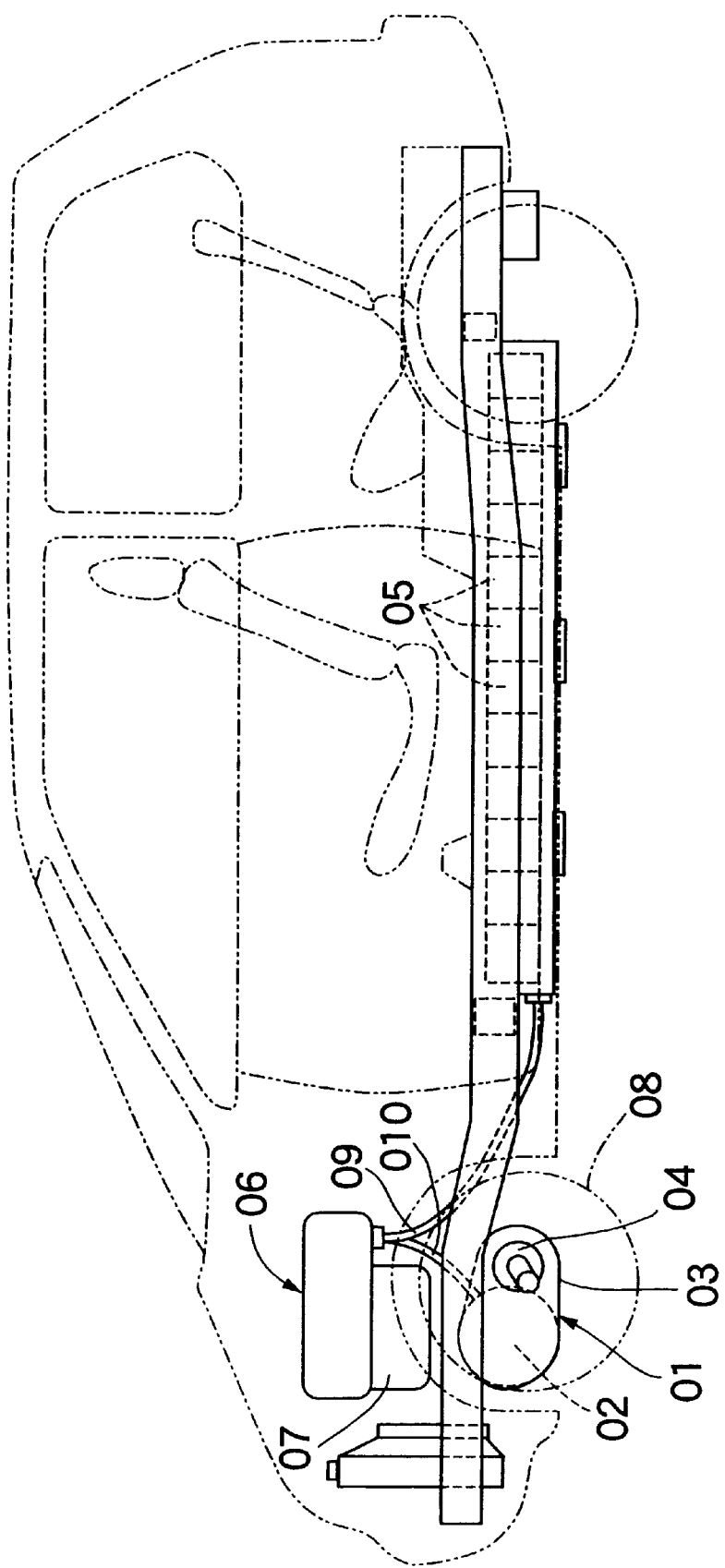
FIG. 8 is a side view of the entirety of a conventional electric vehicle.

A second embodiment of the present invention will now be described with reference to FIGS. 6 and 7, in which only differing portions of the vehicle.

In the above-described first embodiment, the PDU 12 has been mounted in the front portion of the battery box 9 along with the control unit 11, but in the second embodiment, the PDU 12' is integrally mounted to a rear end of the motor 5'. Therefore, three-phase AC power lines $a_1'$, $a_2'$ and $a_3'$ connecting the PDU 12' and the motor 5' to each other are extremely short, which can contribute to the inhibition of the generation of heat due to an electric resistance and to a reduction of the weight thereof.

The inspecting window 62' is opened in the left end face of the motor 5' for the purpose of inspecting the three-phase AC power lines $a_1'$, $a_2'$ and $a_3'$ accommodated within the motor. However, the inspecting window 62 is occluded by the right casing 37' and the left casing 38' of the reduction device 6' coupled to the motor 5' and hence, a noise generated from the three-phase AC power lines $a_1'$, $a_2$ and $a_3'$ cannot be leaked to an external space. As a result, any influence to an audio device and an electronic control unit of the vehicles due to the noise can be suppressed to the minimum.

Moreover, the PDU 12' is mounted at the rear end of the motor 5' and hence, the length of DC power lines extending from the control unit 11 mounted in the front portion of the battery box 9 to the PDU 12' can be suppressed to the minimum.

Although the preferred embodiments of the present invention have been described in detail, it will be understood that the present invention is not limited to the above-described embodiments, and various modifications in design may be made without departing from the spirit and scope of the invention defined in claims.

What is claimed is:

1. An electric vehicle comprising a battery box having batteries accommodated therein and mounted below a floor panel at a central portion of a vehicle body, wherein the supply of electric current from said batteries to a motor mounted at a front portion of said vehicle body is controlled by a control unit, and wherein said control unit is disposed in a space provided within said battery box in front of said batteries, and said battery box is disposed rearwardly of a front cross member of a body frame assembly of the vehicle.

2. An electric vehicle according to claim 1, further including an inverter which is mounted to a rear end of said motor for converting DC current of said batteries into AC current to drive said motor.

3. An electric vehicle according to claim 1, further including driven road wheels which are driven by said motor.

4. An electric vehicle according to claim 1, further including an inverter disposed longitudinally between said batteries and said motor for converting DC current of said batteries into AC current to drive said motor.

5. An electric vehicle according to claim 4, wherein said inverter is disposed in another space provided in said battery box in front of said batteries.

6. An electric vehicle according to claim 1, further including a current inverter operatively connected between said batteries and said motor, and disposed in another space provided in said battery box in front of said batteries.

7. An electric vehicle according to claim 6, wherein said inverter is disposed in another space provided laterally adjacent said control unit.

8. An electric vehicle according to claim 1, further including power lines extending substantially longitudinally between said batteries and said motor via said control unit.

9. An electric vehicle comprising:

a motor mounted at a front portion of a body of the vehicle;

a plurality of batteries for providing electric current to said motor and disposed in a battery box mounted below a floor panel of a body of the vehicle at a central portion of the vehicle body rearwardly of a front cross member of a body frame assembly of the vehicle;

control means for controlling supply of the electric current between the batteries and the motor, said control means being disposed longitudinally between the batteries and the motor in a space provided in a front portion of the battery box.

10. An electric vehicle according to claim 9, further including a current inverter operatively connected between said batteries and said motor for converting DC current of said batteries into AC current to drive said motor, and said inverter is disposed longitudinally between the batteries and said motor.

11. An electric vehicle according to claim 10, wherein said inverter is disposed in another space provided in said battery box in front of said batteries.

12. An electric vehicle according to claim 9, further including a current inverter operatively connected between said batteries and said motor, and disposed in another space provided in said battery box in front of said batteries.

13. An electric vehicle according to claim 12, wherein said inverter is disposed in another space provided laterally adjacent said control unit.

14. An electric vehicle according to claim 9, further including power lines extending substantially longitudinally between said batteries and said motor via said control unit.

15. An electric vehicle according to claim 10, wherein said current inverter is mounted to a rear end of said motor.

16. An electric vehicle according to claim 10, wherein said current inverter is provided integrally with said motor.

17. An electric vehicle according to claim 1, further including a frame, and said battery box is supported by said frame.

18. An electric vehicle according to claim 9, further including a frame, and said battery box is supported by said frame.

* * * * *

UNITED STATES PATENT AND TRADEMARK OFFICE
CERTIFICATE OF CORRECTION

PATENT NO. : 6,220,380 B1
DATED : April 24, 2001
INVENTOR(S) : Yoshinori Mita, Makoto Anazawa, Akishiro Takeuchi It is certified that error appears in the above-identified patent and that said Letters Patent is hereby corrected as shown below:

Column 1,
Line 27, after "extend" insert a comma;
Line numbered between 42 and 43, change "wherein the" to -- wherein --;
Line 66, change "provided by" to -- of --;
Line 67, after "current" insert -- provided --.

Column 2,
Line numbered between 21 and 22 (the line that begins "FIG. 2"), before the semicolon insert -- with the outer vehicle body shown in broken lines to reveal inner details --;
Line 33, change "different" to -- differential --;
Line 56, change "$8^L$ and $8^R$" to -- $8_L$ and $8_R$ --.

Column 3,
Line 13, change "indicate a" to -- indicate --

Column 4,
Line 3, change "an right" to -- a right --;
Line 51, after "of" insert a comma;
Line 60, change "6motor" to -- motor --.

UNITED STATES PATENT AND TRADEMARK OFFICE
CERTIFICATE OF CORRECTION

PATENT NO. : 6,220,380 B1
DATED : April 24, 2001
INVENTOR(S) : Yoshinori Mita, Makoto Anazawa, Akishiro Takeuchi It is certified that error appears in the above-identified patent and that said Letters Patent is hereby corrected as shown below:

<u>Column 5,</u>
Line 14, change "the their" to -- their --;
Line 24, between "vehicle" and the period insert -- are shown --;
Line 37, change "62" to -- 62' --;
Line 40, change "$a_2$" to -- $a_2'$ --'
Line 43, change "vehicles" to -- vehicle --.

Signed and Sealed this

Eleventh Day of December, 2001

Attest:

NICHOLAS P. GODICI
Attesting Officer        Acting Director of the United States Patent and Trademark Office

UNITED STATES PATENT AND TRADEMARK OFFICE
CERTIFICATE OF CORRECTION

PATENT NO. : 6,220,380 B1
DATED : April 24, 2001
INVENTOR(S) : Yoshinori Mita, Makoto Anazawa, Akishiro Takeuchi It is certified that error appears in the above-identified patent and that said Letters Patent is hereby corrected as shown below:

Column 1,
Line 27, after "extend" insert a comma;
Line between 42 and 43, change "wherein the" to -- wherein --;
Line 66, change "provided by" to -- of --;
Line 67, after "current" insert -- provided --.

Column 2,
Between 21 and 22 (the line that begins "FIG. 2"), before the semicolon insert -- with the outer vehicle body shown in broken lines to reveal inner details --;
Line 33, change "different" to -- differential --;
Line 56, change "$8^L$ and $8^R$" to -- $8_L$ and $8_R$ --.

Column 3,
Line 13, change "indicate a" to -- indicate --.

Column 4,
Line 3, change "an right" to -- a right --:
Line 51, after "of" insert a comma;
Line 60, change "6 motor" to -- motor --.

Column 5,
Line 14, change "the their." to -- their --;
Line 24, between "vehicle" and the period insert -- are shown --;
Line 37, change "62" to -- 62' --;
Line 40, change "$a_2$" to -- $a_2'$ --;
Line 43, change "vehicles" to -- vehicle --.

Signed and Sealed this

Eighteenth Day of December, 2001

*Attest:*

*Attesting Officer*

JAMES E. ROGAN
*Director of the United States Patent and Trademark Office*